June 21, 1949.  J. RANSOM  2,474,114
ROCKING HORSE

Filed Dec. 22, 1945  2 Sheets-Sheet 1

INVENTOR
Jack Ransom
BY
Marshall & Marshall
ATTORNEYS

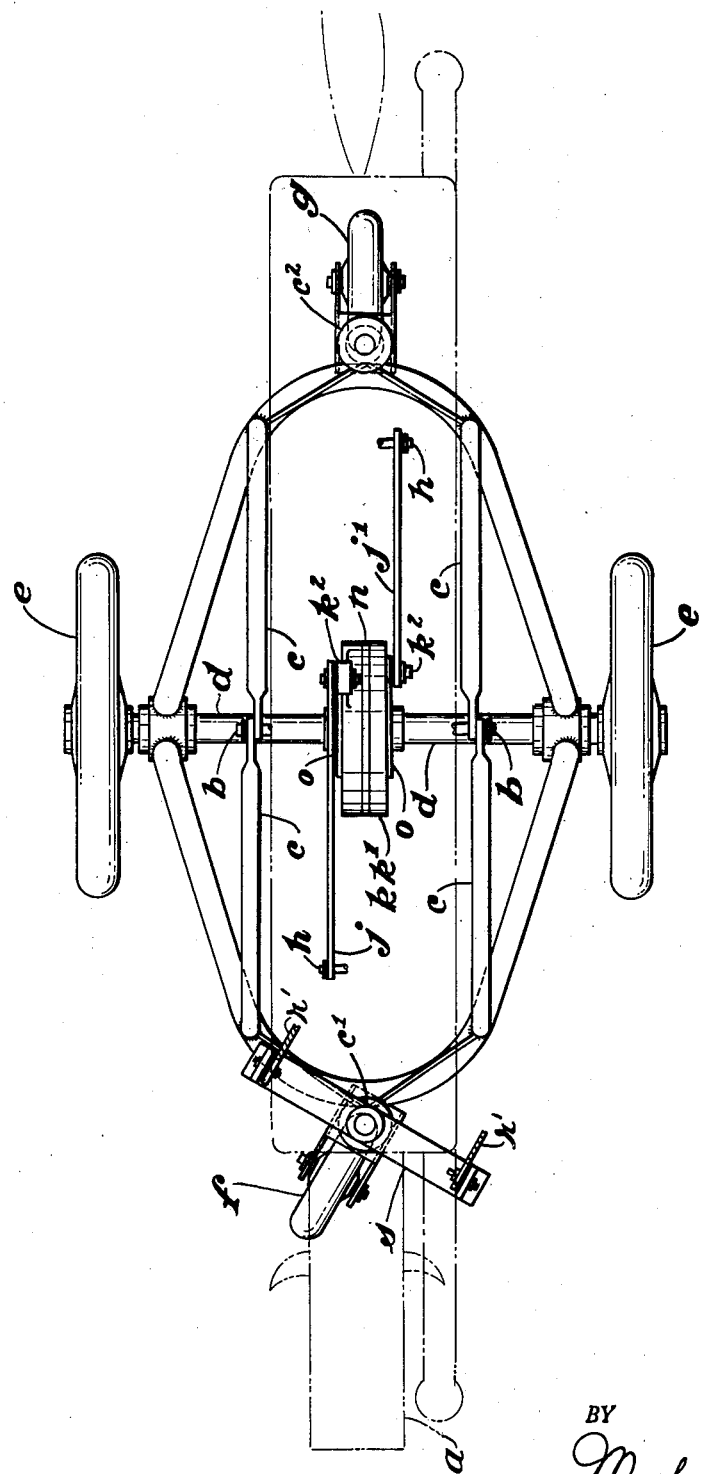

Patented June 21, 1949

2,474,114

UNITED STATES PATENT OFFICE 2,474,114

ROCKING HORSE

Jack Ransom, Cardiff, Wales, assignor of one-third to Eric Sanders, Dunnington, and one-third to Ernest Geoffrey Helliwell, Tettenhall, England Application December 22, 1945, Serial No. 636,854
In Great Britain November 17, 1945

5 Claims. (Cl. 280—1.19)

This invention has reference to improvements connected with rocking horses, and has for its object the provision of means whereby the simulation of a riding action on the saddle of the rocking horse actuates means for automatically propelling the rocking horse on its wheeled support, which includes means for steering the device.

The invention consists of a rocking horse pivotally mounted by means of a framework on a wheeled base incorporating mechanism whereby upon impartation to the body of the horse of a rocking motion about the said pivot there is effected a positive traverse of the device on its wheeled support; means may also be provided for steering the device.

The invention in a preferred form will now be described with particular reference to the accompanying sheet of drawings, in which:

Fig. 4 is a plan view of the wheeled base on an enlarged scale and with the figure of the horse being shown only in dotted lines.

The body of the device comprises a model of a rocking horse $a$ formed and shaped from wood or other suitable material in accordance with general practice. This body is mounted by means of a transverse pivot rod $b$ on the apex of a triangulated frame $c$, the base member of which supports by means of brackets the axle $d$ on which is mounted a pair of wheels $e$. The base member of the framework also constitutes a mounting by means of end sockets $c^1$ $c^2$ for castor wheels $f$ and $g$ respectively. Pivotally connected by means of pins $h$ to the underside of the body of the rocking horse are a pair of links $j$ $j^1$ which at their lower ends are pivotally connected to lugs $k^2$ integrally extending from separate half flanged casings $k$ $k^1$ which surround and contain a gapped disc $l$ which is keyed or bolted to the axle $d$.

Figure 1:
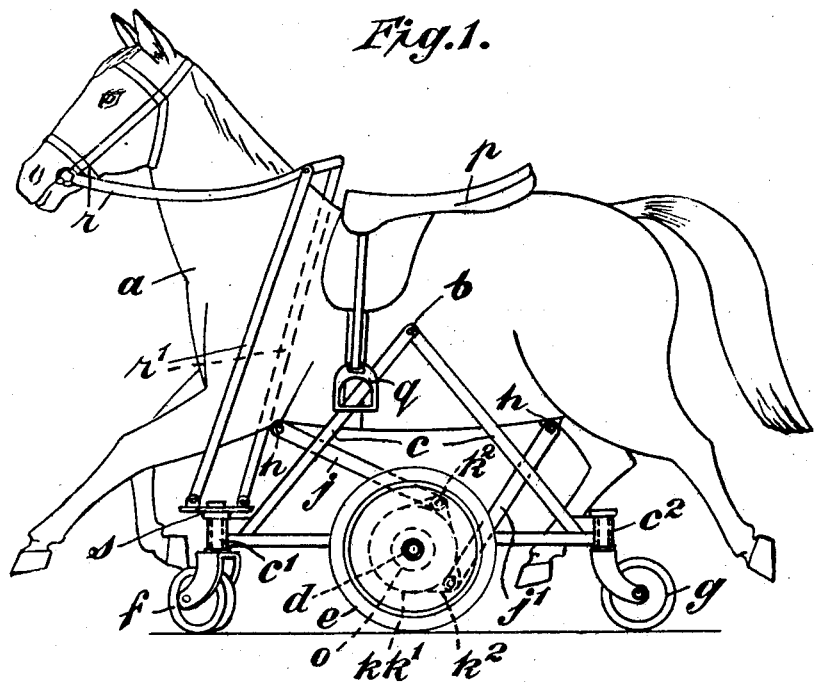
Fig. 1 is a side elevation of the complete device.
Figures 2, 3:
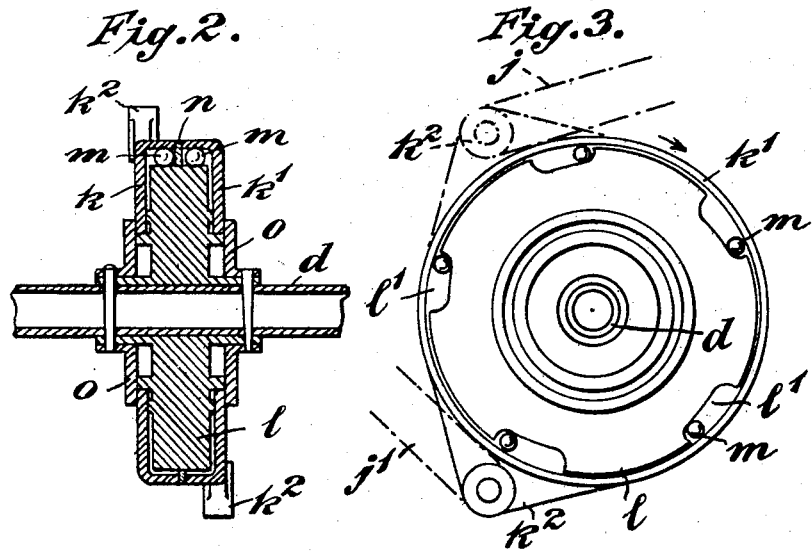
Fig. 2 is a cross-sectional elevation to an enlarged scale taken through the axis of the propulsion mechanism.
Fig. 3 is a side elevation of part of the mechanism seen in Fig. 2 with one half of the casing removed.

Located in the gaps $l^1$ of the disc $l$ are balls or rollers $m$ which constitute anti-friction one-way coupling means between the inner side of the flanged peripheries of the casings $k$ $k^1$ and the bases of the gaps $l^1$ in the disc $l$, these bases being slightly tapered or inclined to provide a wedging effect for the balls or rollers $m$ between the inner periphery of the flanges of the casings $k$ $k^1$ and the disc $l$ on a forward rotational motion being imparted to the casings $k$ or $k^1$ as will be herein-after described. This method of transmission is similar to that employed in certain free wheel hub braking devices associated with pedal cycles. Intermediate the two half casings $k$ $k^1$ is a spacing ring $n$ which serves to separate the respective series of balls or rollers $m$ (see particularly Fig. 2). Retaining discs $o$ are mounted about and secured to the axle $d$ for the purpose of accurately positioning the casings $k$ $k^1$ and the parts contained therein.

Mounted on the body of the horse $a$ is a saddle $p$ from which is suspended a pair of stirrups $q$. Reins and bridle $r$ may be extended as indicated by the lines $r^1$ to a crossbar $s$ which is mounted on the socket $c^1$ carrying the forward castor wheel $f$ whereby a steering motion may be imparted to the device when desired. Obviously this steering motion may be dispensed with or other means may be employed for effecting a similar purpose.

Further it will be appreciated that other one-way forward drive mechanism may be substituted for the ball or roller mechanism described; by way of example a pawl and ratchet wheel one-way mechanism may be substituted.

It will be obvious that when the rider imparts a forward motion to his body the rocking horse will rock the head section downwardly about the pivotal rod $b$. This pivotal motion of the body of the rocking horse transmits a pull or upward motion to the link $j^1$ which in turn transmits a rotational motion in a forward direction to the half casing $k^1$ to which it is attached. This rotational motion of the half casing imparts a forward traverse to the series of balls $m$ located intermediate this half casing and the gapped disc $l$ with the result that a determined intermittent rotational motion is imparted from the disc $l$ to the axle $d$ and therefrom to the pair of wheels $e$. Simultaneous with the upward motion of the link $j^1$ a downward and rearward motion is imparted to the link $j$ and therefrom to the half casing $k$, thus freeing the balls $m$ in this half casing $k$. Likewise if a rearward motion of the rider mounted on the saddle $p$ is imparted to the body of the rocking horse $a$ a contra-wise motion of the links $j$ $j^1$ and of the casings $k$ $k^1$ will respectively obtain as will be readily appreciated without further description.

The term "rocking horse" used herein is deemed to be applicable if circumstances so require to other forms of rockable devices desirably of the toy animal character, by way of example the formation of the body of the device might simulate a camel,

I claim:

1. A self-propelled child's vehicle comprising, in combination, a wheeled base having a drive shaft journaled near its center, at least one driving wheel on said shaft, a framework erected on said base, an animal figure rockingly mounted on said framework at a point above said shaft, a uni-directional clutch comprising a driven member mounted on said shaft and driving members rotatably journaled relative to said driven member, rolling elements frictionally engageable between said driving and driven members when said driving members are rotated in a forward motion producing direction, and at least two links connecting said figure to said driving members of said clutch, the upper ends of said links being pivotally connected to said animal figure at points spaced laterally from the point of rocking mounting of said animal figure on said framework, the lower ends of said links being pivotally connected to said driving members, whereby rocking movement of said animal figure oscillates said driving members and produces forward rotation of said driven member and motion of the vehicle.

2. A self-propelled child's vehicle comprising, in combination, a wheeled base, an animal figure rockingly mounted on a horizontal axis above said base, a shaft journaled on said base below the rocking mounting of said figure, a drive wheel on said shaft, a uni-directional clutch on said shaft, said clutch comprising a driven disc having a plurality of circumferentially extending recesses in its periphery, driving members having circular flanges circumjacent the periphery of said disc and a plurality of rolling elements, one in each of said recesses, the radial depth of each of said recesses below said flanges being less than the diameter of said rolling elements at its forward end and more than the diameter of said rolling elements at its rearward end, and links pivotally attached to said driving members at their lower ends and connected to said figure at points spaced forwardly and rearwardly from said axis at their upper ends.

3. Drive means for a self-propelled child's vehicle having a carriage and an animal figure rockingly mounted thereon comprising, in combination, a drive wheel, a rotatable shaft for said wheel, a uni-directional drive clutch operatively mounted on said shaft, said clutch comprising a disc mounted on said shaft, said disc having circumferentially extending peripheral recesses, a rolling element in each of said recesses, rotatably mounted circular flanged members circumjacent said disc, the depth of each recess below the circular flanges being less than the diameter of the rolling element at its forward end and more than the diameter of the rolling element at its rearward end, and linkage connected between points on said figure laterally spaced from the mounting thereof and said flanged members.

4. Drive means for a self-propelled child's vehicle having a carriage, an animal figure mounted for rocking movement thereon and at least one drive wheel mounted on said carriage, comprising, in combination, a shaft for said drive wheel, a disc-like driven clutch member, said member having circumferentially extending recesses in its periphery, driving clutch members having annular flanges circumjacent the periphery of said driven member, a plurality of rolling elements one in each of said recesses, the depth of each of said recesses beneath said flanges being less than the diameter of one of said elements at one end and more than the diameter of said elements at the other end, and a pair of link bars pivotally connected at one end to said figure forward and behind its point of rocking mounting and pivotally connected to said driving clutch members at the other ends.

5. A self-propelled child's vehicle comprising, in combination, a wheeled base having a drive shaft journaled near its center, at least one driving wheel on said shaft, a framework erected on said base, an animal figure rockingly mounted on said framework at a point above said shaft, a uni-directional clutch comprising a driven member mounted on said shaft and driving members rotatably journaled relative to said driven member, means for operatively connecting said driving members with said driven member when said driving members are rotated in a forward motion producing direction and for operatively disconnecting said members on return rotation of said driving members, and at least two links connecting said figure to said driving members of said clutch, the upper ends of said links being pivotally connected to said animal figure at points spaced laterally from the point of rocking mounting of said animal figure on said framework, the lower ends of said links being pivotally connected to said driving members, whereby rocking movement of said animal figure oscillates said driving members and produces forward rotation of said driven member and motion of the vehicle.

JACK RANSOM.

REFERENCES CITED

The following references are of record in the file of this patent:

UNITED STATES PATENTS

| Number | Name | Date |
|---|---|---|
| 543,874 | Latty | Aug. 6, 1895 |
| 691,548 | Johnson | Jan. 21, 1902 |
| 862,459 | Ferris | Aug. 6, 1907 |
| 1,347,099 | Howes | July 20, 1920 |
| 1,607,423 | Anderson | Nov. 16, 1926 |

FOREIGN PATENTS

| Number | Country | Date |
|---|---|---|
| 20,073 | Austria | May 10, 1905 |
| 87,768 | Germany | Aug. 19, 1896 |